(12) United States Patent
Kawano et al.

(10) Patent No.: US 7,641,970 B2
(45) Date of Patent: Jan. 5, 2010

(54) DIELECTRIC PARTICLE AGGREGATE COMPRISING A SURFACE LAYER OF ZINC TITANATE, LOW TEMPERATURE SINTERABLE DIELECTRIC CERAMIC COMPOSITION USING SAME

(75) Inventors: Takafumi Kawano, Ube (JP); Masataka Yamanaga, Ube (JP); Koichi Fukuda, Ube (JP)

(73) Assignee: UBE Industries, Ltd., Yamaguchi (JP)

( * ) Notice: Subject to any disclaimer, the term of this patent is extended or adjusted under 35 U.S.C. 154(b) by 204 days.

(21) Appl. No.: 10/590,779

(22) PCT Filed: Mar. 3, 2005

(86) PCT No.: PCT/JP2005/003628

§ 371 (c)(1),
(2), (4) Date: Aug. 25, 2006

(87) PCT Pub. No.: WO2005/085154

PCT Pub. Date: Sep. 15, 2005

(65) Prior Publication Data

US 2007/0172652 A1    Jul. 26, 2007

(30) Foreign Application Priority Data

Mar. 5, 2004  (JP) .............................. 2004-061713

(51) Int. Cl.
*B32B 5/16* (2006.01)
*B05D 3/02* (2006.01)
*C04B 35/462* (2006.01)
*C04B 35/468* (2006.01)
*C04B 35/47* (2006.01)

(52) U.S. Cl. ................. 428/403; 427/215; 427/226; 427/372.2; 428/570; 501/134; 501/136; 501/137; 501/138; 501/139

(58) Field of Classification Search ................. 428/403, 428/404, 405, 406; 501/134, 137, 138, 139; 427/215, 226, 372.2
See application file for complete search history.

(56) References Cited

U.S. PATENT DOCUMENTS 4,335,216 A * 6/1982 Hodgkins et al. .............. 501/32

(Continued)

FOREIGN PATENT DOCUMENTS

EP    92104372.5    9/1992

(Continued)

OTHER PUBLICATIONS

Supplementary EPO Search Report completed on Oct. 30, 2007 in counterpart EP Appln. No. 05 71 9932 mailed Nov. 7, 2007.

(Continued)

*Primary Examiner*—H. (Holly) T Le
(74) *Attorney, Agent, or Firm*—Frommer Lawrence & Haug LLP; Ronald R Santucci

(57) ABSTRACT

A low temperature sinterable dielectric ceramic composition is obtained by bending 2.5-20 parts by weight of a glass component per 100 parts by weight of an aggregate of dielectric particles which are composed of Ti-containing dielectric material and contain an oxide including Ti and Zn in the surface portions. A low temperature sintered dielectric ceramic is produced by sintering this low temperature sinterable dielectric ceramic composition at 880 to 1000° C. With this low temperature sinterable dielectric ceramic composition, there can be obtained a multiplayer electronic component having an internal conductor composed of Ag, Cu or an alloy containing at least one of them.

14 Claims, 4 Drawing Sheets

U.S. PATENT DOCUMENTS

| | | | | |
|---|---|---|---|---|
| 4,485,181 A | * | 11/1984 | Sakabe | 501/136 |
| 4,499,521 A | * | 2/1985 | McSweeney et al. | 361/321.5 |
| 4,582,814 A | * | 4/1986 | Thomas | 501/136 |
| 5,082,811 A | * | 1/1992 | Bruno | 501/134 |
| 5,242,674 A | * | 9/1993 | Bruno et al. | 252/519.1 |
| 5,296,426 A | * | 3/1994 | Burn | 501/139 |
| 5,439,857 A | * | 8/1995 | Iwamoto et al. | 501/136 |
| 5,635,433 A | * | 6/1997 | Sengupta | 501/137 |
| 5,866,492 A | * | 2/1999 | Kim et al. | 501/134 |
| 5,916,834 A | * | 6/1999 | Terashi et al. | 501/135 |
| 6,268,054 B1 | * | 7/2001 | Costantino et al. | 428/403 |
| 6,469,245 B2 | * | 10/2002 | Son | 174/382 |
| 6,582,763 B1 | * | 6/2003 | Nishimura et al. | 427/216 |
| 6,656,590 B2 | * | 12/2003 | Venigalla et al. | 428/403 |
| 6,673,274 B2 | * | 1/2004 | Venigalla et al. | 252/570 |
| 6,703,336 B2 | * | 3/2004 | Fukuda et al. | 501/139 |
| 6,794,324 B1 | * | 9/2004 | Kim et al. | 501/134 |
| 7,276,461 B2 | * | 10/2007 | Kawano et al. | 501/134 |

FOREIGN PATENT DOCUMENTS

| | | |
|---|---|---|
| JP | 8-239263 A | 9/1996 |
| JP | 10-330161 A | 12/1998 |
| JP | 2000 302544 | 10/2000 |
| JP | 2002-326867 A | 11/2002 |
| JP | 2003 221274 | 8/2003 |
| JP | 2004-26542 A | 1/2004 |
| JP | 2004-26543 A | 1/2004 |

OTHER PUBLICATIONS

EPO Communication pursuant to Article 94 (3) EPC dated Jul. 25, 2008.

* cited by examiner

SPOT1

SPOT5

DIELECTRIC PARTICLE AGGREGATE COMPRISING A SURFACE LAYER OF ZINC TITANATE, LOW TEMPERATURE SINTERABLE DIELECTRIC CERAMIC COMPOSITION USING SAME

This application is a 371 of PCT/JP2005/003628 filed on Mar. 3, 2005, published on Sep. 15, 2005 under publication number WO2005/085154A1which claims priority benefits from Japanese Patent Application Number 2004-061713filed Mar. 5, 2004.

TECHNICAL FIELD

The present invention relates to a low temperature sinterable dielectric ceramic composition to be used for manufacturing laminated dielectric resonators, laminated ceramic capacitors, laminated LC filters and laminated dielectric substrates, which are electronic parts or elements or components of laminated or multiplayer structure mainly used in electronic devices for microwave band, to a dielectric particle aggregate to be used for such a composition, to a low-temperature-sintered dielectric ceramic produced by using such a low temperature sinterable dielectric ceramic composition and also to methods of manufacturing the same. More particularly, the present invention relates to a dielectric particle aggregate that makes it possible to sinter a dielectric material containing Ti, which has hitherto been believed to be hardly sinterable at low temperature not higher than 1,000° C. if made to contain glass, to a low temperature sinterable dielectric ceramic composition that can be obtained by using such a dielectric particle aggregate, to a low-temperature-sintered dielectric ceramic produced by using such a low temperature sinterable dielectric ceramic composition and also to methods of manufacturing the same.

BACKGROUND ART

There has been an ever-increasing demand for compact dielectric resonators showing a small dielectric loss (tan δ) and stable dielectric characteristics in response to the trend toward a higher degree of integration of microwave circuits. When forming a dielectric filter by means of a dielectric resonator, the characteristics required for the dielectric to be used for the dielectric resonator include (1) that it is possible to make the temperature coefficient $\tau_f$ of the resonance frequency show a small absolute value in order to minimize fluctuations of the characteristics relative to temperature changes and (2) that it is possible to make the Q value of resonance show a large value in order to minimize the insertion loss as a requirement to be met by the dielectric filter. Additionally, since the length of the resonator is restricted by the specific dielectric constant $\epsilon_r$ of the dielectric in the microwave frequency range that is to be used for mobile phones or the like, the specific dielectric constant $\epsilon_r$ is required to show a large value when downsizing the element. The length of the dielectric resonator is determined by referring to the wavelength of the electromagnetic wave to be used for the resonator. The wavelength λ of the electromagnetic wave that is propagated through a dielectric showing a specific dielectric constant of $\epsilon_r$ is expressed by $\lambda=\lambda_0/(\epsilon r)^{1/2}$, where $\lambda_0$ is the wavelength of the electromagnetic wave when propagated in vacuum. Therefore, the element can be downsized more when the dielectric constant of the dielectric to be used for the element is greater.

Meanwhile, laminated dielectric resonators or the like are formed as laminated electronic parts by arranging internal conductors therein in layers and sandwiching them by means of laminated and sintered dielectric ceramics. Conventionally, noble metals such as Au, Pt and Pd are used as materials of internal conductors of such laminated electronic parts. However, from the viewpoint of cost, less expensive Ag, Cu and alloys containing Ag and/or Cu as principal ingredient are being popularly used for internal conductors. Particularly, Ag and alloys containing Ag as principal ingredient provide an advantage of improving the Q characteristic of dielectric resonators because of the low DC resistance they have and hence there is an increasing demand for such materials. However, Ag and alloys containing Ag as principal ingredient have a melting point as low as about 960° C. so that it is necessary to use any of them in combination with a dielectric material that can be sintered stably at lower temperature.

Dielectric materials obtained by adding glass as ingredient are being used as materials that satisfy the above-described requirements of dielectric characteristics in order to make it possible to sinter them at low temperature. Glass ceramics made of a composite material of a $BaO-TiO_2-Nd_2O_3$ type ceramic and glass are known as dielectric materials showing a high dielectric constant (Patent Document 1: JP-A-8-239263 and Patent Document 2: JP-A-10-330161).

Patent Document 1: JP-A-8-239263
Patent Document 2: JP-A-10-330161

DISCLOSURE OF THE INVENTION

Problems to be Solved by the Invention

However, it is difficult to sinter a $BaO-TiO_2-Nd_2O_3$ type ceramic material at low temperature and the glass ceramic material disclosed in Patent Document 1 needs to be crushed to particles showing an average particle size of not larger than 0.1 μm. The crushing process consumes a long time. Additionally, since such a crushed material can hardly be sintered, the glass ceramic material entails a problem of requiring a complex sintering pattern when sintering a laminate of green sheets.

The glass ceramic material disclosed in Patent Document 2 may be made to show an average particle diameter of 0.3 μm by adding CuO, ZuO and/or SnO along with glass for low temperature sintering. However, since it is still difficult to sinter the glass ceramic material at low temperature and the crushing process consumes a long time. Additionally, there also arises a problem of requiring a complex sintering pattern when sintering a laminate of green sheets.

Like the above-described $BaO-TiO_2-Nd_2O_3$ type ceramic materials, materials such as $BaTiO_3$ and $SrTiO_3$ also show a high dielectric constant but it is difficult to sinter them. In short, these materials are hardly sinterable at low temperature if simply mixed with glass and sintered.

In view of the above-identified problems, it is therefore a first object of the present invention to provide a low temperature sinterable dielectric ceramic composition that can be sintered with ease at low temperature not higher than 1,000° C. if it contains Ti that is a hardly sinterable element.

A second object of the present invention is to provide a dielectric particle aggregate to be used for such a low temperature sinterable dielectric ceramic composition and a low-temperature-sintered dielectric ceramic produced by using such a low temperature sinterable dielectric ceramic composition.

Means for Solving the Problem

According to the present invention, in order to achieve at least one of the above objects, there is provided a dielectric particle aggregate made of dielectric particles containing Ti, characterized in that the particles contain one or more oxides including Ti and Zn in the surface layer thereof.

In one aspect of the present invention, the oxides including Ti and Zn are $ZnTiO_3$ and/or $Zn_2TiO_4$. In one aspect of the present invention, the dielectric containing Ti is a $BaO$—$TiO_2$—$Nd_2O_3$ type dielectric, a $BaTiO_3$ type dielectric or an $SrTiO_3$ type dielectric. In one aspect of the present invention, the dielectric containing Ti is a $BaO$—$TiO_2$—$Nd_2O_3$ type dielectric that contains as principal ingredients BaO by 10 to 16 mol %, $TiO_2$ by 67 to 72 mol % and $Nd_2O_3$ by 16 to 18 mol % and as auxiliary ingredients $Bi_2O_3$ by 7 to 10 parts by weight and $Al_2O_3$ by 0.3 to 1.0 parts by weight relative to 100 parts by weight of the principal ingredients. In one aspect of the present invention, the surface layer that contains one or more oxides including Ti and Zn has a thickness not greater than 50 nm. In one aspect of the present invention, the dielectric particle aggregate has an average particle size of 0.4 μm to 3.0 μm.

According to the present invention, in order to achieve at least one of the above objects, there is provided a method of manufacturing the above dielectric particle aggregate, characterized by comprising the steps of mixing ZnO with an aggregate of particles of a dielectric base material containing Ti and subjecting the resultant mixture to a calcinatory process. In one aspect of the present invention, 0.5 to 10 parts by weight of ZnO is mixed with 100 parts by weight of the aggregate of particles of dielectric base material. In one aspect of the present invention, the calcinatory process is conducted in an oxygen-containing atmosphere. In one aspect of the present invention, the temperature of the calcinatory process is 900 to 1,200° C.

According to the present invention, in order to achieve at least one of the above objects, there is provided a low temperature sinterable dielectric ceramic composition characterized by containing the above dielectric particle aggregate by 100 parts by weight and a glass component by 2.5 to 20 parts by weight. In one aspect of the present invention, the glass component contains ZnO by 45 to 70 wt %, $B_2O_3$ by 5 to 13 wt %, $SiO_2$ by 7 to 40 wt % and $Al_2O_3$ by 8 to 20 wt %.

According to the present invention, in order to achieve at least one of the above objects, there is provided a low-temperature-sintered dielectric ceramic characterized by containing 100 parts by weight of dielectric particles constituting the above dielectric particle aggregate and 2.5 to 20 parts by weight of glass component. In one aspect of the present invention, the glass component contains ZnO by 45 to 70 wt %, $B_2O_3$ by 5 to 13 wt %, $SiO_2$ by 7 to 40 wt % and $Al_2O_3$ by 8 to 20 wt %.

According to the present invention, in order to achieve at least one of the above objects, there is provided a method of manufacturing a low-temperature-sintered dielectric ceramic characterized by comprising the step of sintering the above low temperature sinterable dielectric ceramic composition at 880 to 1,000° C. In one aspect of the present invention, the glass component contains ZnO by 45 to 70 wt %, $B_2O_3$ by 5 to 13 wt %, $SiO_2$ by 7 to 40 wt % and $Al_2O_3$ by 8 to 20 wt %. In one aspect of the present invention, the sintering step is conducted on a laminate having a layer containing the low temperature sinterable dielectric ceramic composition and a layer containing metal to thereby obtain an electronic part having a laminated structure where the metal layer functions as an internal conductor. In one aspect of the present invention, the metal layer is made of Ag, Cu or an alloy containing at least either of them.

EFFECTS OF THE INVENTION

Thus, according to the present invention, there is provided a low temperature sinterable dielectric ceramic composition by compounding 100 parts by weight of a dielectric particle aggregate made of a dielectric containing Ti and having a surface layer containing one or more oxides of Ti and Zn and 2.5 to 20 parts by weight of a glass component. Then, it is possible to produce a low-temperature-sintered dielectric ceramic by sintering such a low temperature sinterable dielectric ceramic composition at 880 to 1,000° C. Then, as a result, it is possible to provide an electronic part having a laminated or multi-layered structure and an internal conductor made of Ag, Cu or an alloy containing at least either of them. Thus, according to the present invention, it is possible to sinter at low temperature not higher than 1,000° C. a dielectric material containing Ti that shows a high dielectric constant and provides advantages when used for electronic parts but has been hitherto difficult to be sintered at low temperature not higher than 1,000° C. that is lower than the melting point of Ag, Cu or an alloy containing at least either of them.

BEST MODE FOR CARRYING OUT THE INVENTION

Figure 1:
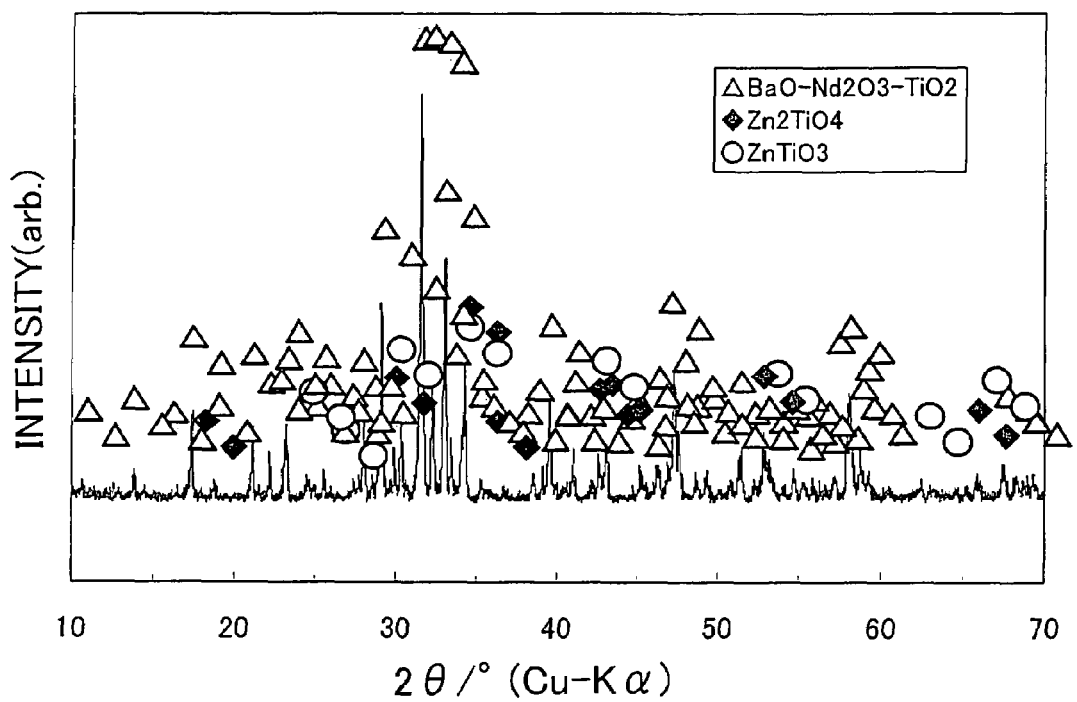
FIG. 1 is an X-ray diffraction graph of the dielectric particle aggregate according to the invention obtained in Example 1.

Now, a dielectric particle aggregate, a low temperature sinterable dielectric ceramic composition, a low-temperature-sintered dielectric ceramic and methods of manufacturing the same according to the present invention will be described in greater detail by referring to the accompanying drawings.

A dielectric particle aggregate according to the present invention is an aggregate of a large number of particles of a dielectric containing Ti (titanium element) and may also be referred to as "powder of dielectric particles" hereinafter. Particles of a dielectric containing Ti contain oxides including Ti and Zn in the surface layer thereof. Examples of dielectrics containing Ti that can be used for the purpose of the present invention include $BaO$—$TiO_2$—$Nd_2O_3$ type dielectrics, $BaTiO_3$ type dielectrics and $SrTiO_3$ type dielectrics. Particularly, $BaO$—$TiO_2$—$Nd_2O_3$ type dielectrics containing as principal ingredients BaO by 10 to 16 mol %, $TiO_2$ by 67 to 72 mol % and $Nd_2O_3$ by 16 to 18 mol % and as auxiliary ingredients $Bi_2O_3$ by 7 to 10 parts by weight and $Al_2O_3$ by 0.3 to 1.0 parts by weight relative to 100 parts by weight of the principal ingredients that are calcined are preferable for the purpose of the present invention. Examples of oxides of Ti and Zn that are contained in the surface layer of particles include $ZnTiO_3$ and/or $Zn_2TiO_4$. The thickness of the surface layer that contains oxides of Ti and Zn is typically not less than 10 nm and not more than 50 nm. However, the thickness of the surface layer that contains oxides of Ti and Zn does not necessarily need to be uniform over the entire surface of particle and the above values define the range of the average. A dielectric particle aggregate according to the present invention shows an average particle size of 0.4 μm to 3.0 μm.

A method of manufacturing dielectric particle aggregate according to the present invention comprises the steps of mixing ZnO with an aggregate of particles of a dielectric base material containing Ti and subjecting the obtained mixture to a calcinatory process. Particles of the dielectric base material containing Ti that practically do not contain Zn may be used for the purpose of the present invention. Preferably 0.5 to 10 parts by weight of ZnO are mixed with 100 parts by weight of an aggregate of particles of the dielectric base material. The calcinatory process is preferably conducted in an oxygen-containing atmosphere (e.g., the atmosphere of the earth). The temperature at which the calcinatory process is conducted is typically 900 to 1,200° C.

A low temperature sinterable dielectric ceramic composition according to the present invention is obtained by compounding 100 parts by weight of a dielectric particle aggregate and 2.5 to 20 parts by weight of a glass component. The glass component may typically contain ZnO by 45 to 70 parts by weight, $B_2O_3$ by 5 to 13 parts by weight, $SiO_2$ by 7 to 40 parts by weight and $Al_2O_3$ by 8 to 20 parts by weight.

A low-temperature-sintered dielectric ceramic according to the present invention contains 100 parts by weight of dielectric particles constituting the dielectric particle aggregate and 2.5 to 20 parts by weight of the glass component. It can be manufactured by means of a manufacturing method comprising the step of sintering the low temperature sinterable dielectric ceramic composition at 880 to 1,000° C. The sintering step is conduced typically on a laminate of a layer containing the low temperature sinterable dielectric ceramic composition and a layer containing metal. By the sintering step, it is possible to obtain an electronic part having a laminated or multi-layered structure where the metal layer functions as an internal conductor and is made of Ag, Cu or an alloy containing at least either of them.

The present invention will be described in greater detail below.

A method of manufacturing a low-temperature-sintered dielectric ceramic according to the present invention comprises a step of mixing ZnO with particles (an aggregate of a large number of particles), which are dielectric particles containing the Ti element (particles of a base material) and sintering (calcining) the mixture to form one or more oxides of Ti and Zn on the surface (in the surface layer) of the particles of the dielectric base material that contain the Ti element (a step of manufacturing a dielectric particle aggregate) and a step of mixing powder of dielectric particles with one or more oxides of Ti and Zn formed on the surface of the particles of the dielectric base material with a glass component (to obtain a low temperature sinterable dielectric ceramic composition) and sintering the mixture at 880 to 1,000° C. In order to achieve the low temperature sintering operation, according to the present invention, a ZnO type composite oxide is formed on the surface of particles of the dielectric base material containing the Ti element and a glass component is added thereto. The glass component may be a $ZnO$—$B_2O_3$—$SiO_2$—$Al_2O_3$ type glass material.

Materials that can be used for particles of the dielectric base material containing the Ti element for the purpose of the present invention include $BaO$—$TiO_2$—$Nd_2O_3$ type materials and such materials as $BaTiO_3$ and $SrTiO_3$. For example, $BaO$—$TiO_2$—$Nd_2O_3$ type dielectric materials that contain $Bi_2O_3$ and $Al_2O_3$ show a dielectric characteristic of a high dielectric constant per se. However, for such a material to show a good dielectric characteristic by itself, it normally has to be sintered at high temperature of 1,300° C. or more. When Cu or Ag is used as material of internal electrode, the use of a dielectric material that can be sintered as a temperature level of about 1,000° C. is required. Note that the melting point of Cu is 1,083° C. and that of Au is 1,063° C. While the melting point of Ag is 960° C., it has been known that the internal Ag electrode pattern is not deformed if it is sintered at 1,000° C. provided that Ag is buried in the inside of the dielectric material. Therefore, it is possible to manufacture a laminated electronic part by sintering a laminate having a layer containing any of the above-listed metals that are preferable for an internal electrode and a layer containing a dielectric ceramic composition if it can be sintered at a temperature level not higher than 1,000° C.

The $BaO$—$TiO_2$—$Nd_2O_3$ type material is preferably a calcined $BaO$—$TiO_2$—$Nd_2O_3$ type high dielectric constant material that contains as principal ingredients BaO by 10 to 16 mol %, $TiO_2$ by 67 to 72 mol % and $Nd_2O_3$ by 16 to 18 mol % and as auxiliary ingredients $Bi_2O_3$ by 7 to 10 parts by weight and $Al_2O_3$ by 0.3 to 1.0 parts by weight relative to 100 parts by weight of the principal ingredients. A $BaO$—$TiO_2$—$Nd_2O_3$ type material having such a composition can optimally show the characteristics of the material itself as will be described below. For example, the obtained dielectric ceramic shows a small specific dielectric constant when the content ratio of BaO that is a principal ingredient is less than 10 mol %, whereas the absolute value of the temperature coefficient of the resonance frequency of the obtained dielectric ceramic tends to rise when the content ratio of BaO exceeds 16 mol %. The sinterability of the dielectric material is poor when the content ratio of $TiO_2$ that is also a principal ingredient is less than 67 mol %, whereas the absolute value of the temperature coefficient of the resonance frequency of the obtained dielectric ceramic tends to rise when the content ratio of $TiO_2$ exceeds 72 mol %. The absolute value of the temperature coefficient of the resonance frequency of the obtained dielectric ceramic is too large when the content ratio of $Nd_2O_3$ that is also a principal ingredient is less than 16 mol %, whereas the specific dielectric constant of the obtained dielectric ceramic tends to fall when the content ratio of $Nd_2O_3$ exceeds 18 mol %. On the other hand, the effect of improving the temperature coefficient of the resonance frequency of the obtained dielectric ceramic is poor when the content ratio of $Bi_2O_3$ that is an auxiliary ingredient is less than 7 parts by weight relative to 100 parts by weight of the principal ingredients, whereas the sinterability of the dielectric ceramic is poor when the content ratio of $Bi_2O_3$ exceed 10 parts by weight. The effect of improving the Q value of resonance and the temperature coefficient of the resonance frequency of the obtained dielectric ceramic is poor when the content ratio of $Al_2O_3$ that is also an auxiliary ingredient is less than 0.3 parts by weight relative to 100 parts by weight of the principal ingredients, whereas the specific dielectric constant of the obtained dielectric ceramic is poor and the Q value of resonance of the dielectric ceramic tends to fall when the content ratio of $Al_2O_3$ exceed 1.0 part by weight.

A method of manufacturing a low-temperature-sintered dielectric ceramic according to the present invention comprises a step of mixing ZnO with powder of particles of a dielectric base material containing the Ti element and a step of subjecting the mixture to a calcinatory process. As a result, the $TiO_2$ component in the particles of the dielectric base material reacts with ZnO to form one or more oxides of Ti and Zn on the surface of the particles of the dielectric base material. Examples of oxides of Ti and Zn include $ZnTiO_3$, $Zn_2TiO_4$ and a mixture thereof. Both $ZnTiO_3$ and $Zn_2TiO_4$ show a high dielectric constant and affinity for glass so that they are believed to take a role of binding particles of the dielectric base material and the glass component that is added later.

One or more oxides of Ti and Zn are formed on the surface of particles of the dielectric base material in order to achieve an objective of allowing particles of the dielectric base material of high dielectric constant to be sintered at low temperature. As a result of intensive research efforts for achieving the objective, the inventors of the present invention found that the relative density (actual density/theoretical density) of the sintered ceramic is effectively improved when one or more oxide of Ti and Zn are formed on the surface of particles of the dielectric base material at an appropriate rate. When a BaO—$TiO_2$—$Nd_2O_3$ type dielectric material is used, ZnO is added preferably by 0.5 to 10 parts by weight relative to 100 parts by weight of the base material. The relative density of the obtained dielectric ceramic tends to fall when the content ratio of ZnO is less than 0.5 parts by weight, whereas the specific dielectric constant of the obtained dielectric ceramic tends to fall when the content ratio of ZnO exceed 10 parts by weight. When the aggregate of dielectric particles is observed by means of X-ray diffractometry, diffraction peaks appear due to the ingredients of particles of the base material and also due to $Zn_2TiO_4$ and/or $ZnTiO_3$ in the surface layer as shown in FIG. 1.

According to the present invention, a low temperature sinterable dielectric ceramic composition is obtained by mixing powder of particles of the dielectric base material containing one or more oxides of Ti and Zn on the surface thereof with a glass component (glass material). Then, the low temperature sinterable dielectric ceramic composition is sintered at 880 to 1,000° C.

The glass material is added in order to crystallize the high dielectric constant material at low temperature. As a result of a series of experiments that the inventors of the present invention conducted on glasses of various different compositions, the inventors found that the relative density (actual density/theoretical density) of the sintered ceramic is effectively improved when a ZnO—$B_2O_3$—$SiO_2$—$Al_2O_3$ type glass material is added at an appropriate rate.

The glass component is prepared to show a form of particles and mixed or compounded with powder of dielectric particles to obtain a low temperature sinterable dielectric ceramic composition. Dielectric particles and particles of the glass component to be used for forming a low temperature sinterable dielectric ceramic composition preferably have a uniform particle size in order to obtain a low-temperature-sintered dielectric ceramic that shows a high non-loaded Q value and a stable specific dielectric constant $\epsilon_r$ after a sintering operation. For this purpose, the aggregate of dielectric particles and the aggregate of the glass component preferably show an average particle size of not greater than 3.0 µm, more preferably not greater than 2.0 µm, most preferably not greater than 1.0 µm. Particles give rise to a problem of difficulty of handling when their average size is excessively small. Therefore, the average particle size is preferably not less than 0.4 µm, more preferably not less than 0.5 µm.

The glass component preferably contains ZnO by 45 to 70 weight %, $B_2O_3$ by 5 to 13 weight %, $SiO_2$ by 7 to 40 weight % and $Al_2O_3$ by 8 to 20 weight %. The relative density of the obtained dielectric ceramic tends to fall when the content of ZnO is less than 45 weight %, whereas the specific dielectric constant of the obtained dielectric ceramic tends to fall when the content of ZnO is more than 70 weight %. The Q value of resonance of the obtained dielectric ceramic tends to fall when the content of $B_2O_3$ is less than 5 weight %, whereas the relative density of the obtained dielectric ceramic tends to fall when the content of $B_2O_3$ is more than 13 weight %. The effect of improving the temperature coefficient of the resonance frequency of the obtained dielectric ceramic is poor when the content of $SiO_2$ is less than 7 weight %, whereas the relative density of the obtained dielectric ceramic tends to fall when the content of $SiO_2$ is more than 40 weight %. The Q value of resonance of the obtained dielectric ceramic tends to fall when the content of $Al_2O_3$ is less than 8 weight %, whereas the specific dielectric constant of the obtained dielectric ceramic tends to fall when the content of $Al_2O_3$ is more than 20 weight %.

Figure 2:
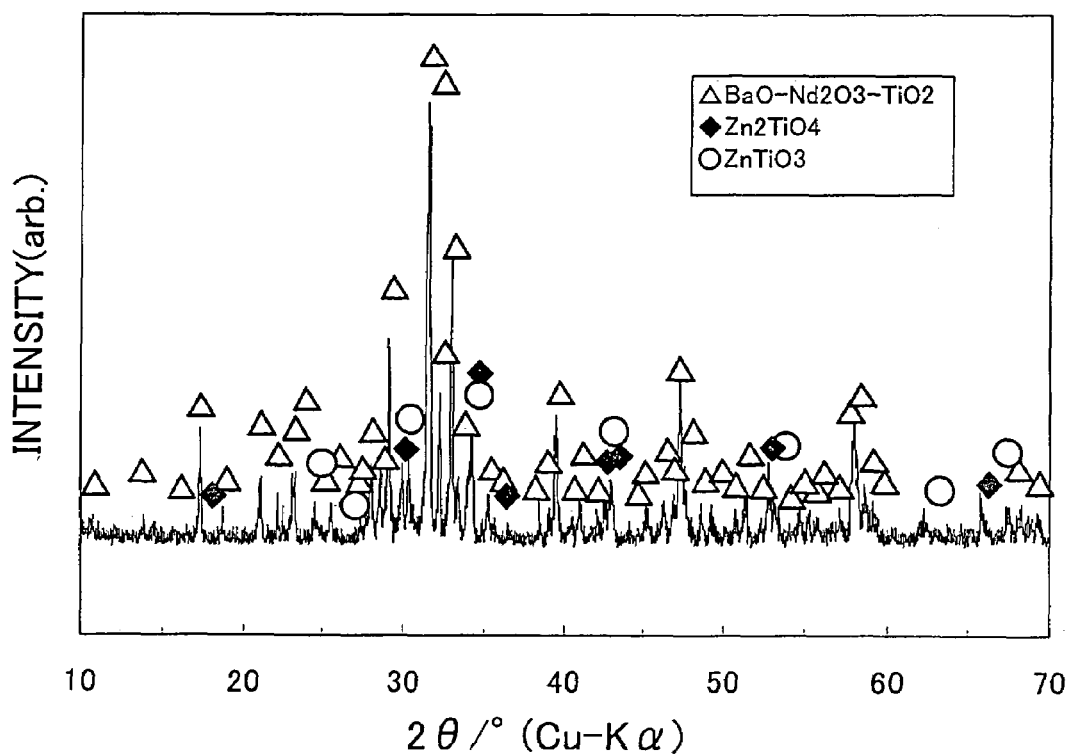
FIG. 2 is an X-ray diffraction graph of the dielectric ceramic obtained in Example 1.

Preferably, 2.5 to 20 parts by weight of the glass material is mixed with 100 parts by weight of powder of dielectric particles containing one or more oxides of Ti and Zn formed on the surfaces of particles of the dielectric base material. As the glass material is added by 2.5 to 20 parts by weight to 100 parts by weight of particles of the dielectric material where ZnO type composite oxide is formed on the surface, it is possible to produce a low-temperature-sintered dielectric ceramic showing a relative density of not less than 90% by sintering the low temperature sinterable dielectric ceramic composition at an appropriate temperature level between 880 and 1,000° C. The dielectric ceramic composition is hardly sintered when the glass material is added by less than 2.5 parts by weight, whereas the specific dielectric constant of the obtained dielectric ceramic tends to fall when the glass material is added by more than 20 parts by weight. FIG. 2 shows, for example, an X-ray diffraction graph of the dielectric ceramic produced in this manner.

The method of producing a dielectric ceramic according to the present invention will be described further below. Firstly, zinc oxide and powders of dielectric particles containing the Ti element are taken by the respective amounts to show a predetermined ratio and mixed with a solvent, which may be water or alcohol, by wet mixing. Subsequently, after removing the water or alcohol, the mixture is calcined at 900 to 1,200° C. for about 1 to 5 hours in an oxygen-containing atmosphere (e.g., the atmosphere of the earth). The calcined powder is powder of dielectric particles with one or more oxides of Ti and Zn formed on the surfaces of particles of the dielectric base material that contains the Ti element. Thereafter, powder of dielectric particles where one or more oxides of Ti and Zn are formed on the surfaces and lead-free low melting point glass containing ZnO by 45 to 70 weight %, $B_2O_3$ by 5 to 13 weight %, $SiO_2$ by 7 to 40 weight % and $Al_2O_3$ by 8 to 20 weight % are taken by the respective amounts to show a predetermined ratio and mixed with each other with a solvent, which may be water or alcohol, by wet mixing. Then, after removing the water, alcohol or the like, raw material powder (a low temperature sinterable dielectric ceramic composition) for forming a low-temperature-sintered dielectric ceramic is prepared.

The raw material powder to be used for producing a low-temperature-sintered dielectric ceramic is sintered so as to take a form of pellets and is observed for the dielectric characteristics in that form. More specifically, an organic binder such as polyvinyl alcohol is mixed with the raw material powder and the mixture is homogenized, dried, crushed and subsequently molded under pressure (about 100 to 1,000 kg/cm$^2$) to show a form of pellet. The obtained molded product is sintered at 880 to 1,000° C. in an oxygen-containing atmosphere such as air to obtain a dielectric ceramic where a crystal phase of the dielectric material that contains the Ti element and on the surface of which oxides of Ti and Zn are formed and a glass phase coexist. Glass is arranged among dielectric particles.

The present invention also relates to an aggregate of dielectric particles with $ZnTiO_3$ and/or $Zn_2TiO_4$ formed on the surfaces of particles of the dielectric base material that contains the Ti element. Examples of dielectric base materials in the form of particles that contain the Ti element include $BaO$—$TiO_2$—$Nd_2O_3$ type materials and materials such as $BaTiO_3$ and $SrTiO_3$. ZnO is mixed with powder of such a dielectric base material that contains the Ti element and the mixture is sintered to obtain dielectric particles with $ZnTiO_3$ and/or $Zn_2TiO_4$ formed on the surfaces of particles of the dielectric base material that contains the Ti element.

It is possible to obtain a low-temperature-sintered dielectric ceramic according to the present invention and achieve a relative density of not less than 90% for the dielectric ceramic by mixing dielectric particles with $ZnTiO_3$ and/or $Zn_2TiO_4$ formed on the surfaces of particles of the dielectric base material that contains the Ti element with a glass component and sintering the mixture at an appropriate temperature level between 880 and 1,000° C.

A particularly preferable example of dielectric that contains the Ti element is a $BaO$—$TiO_2$—$Nd_2O_3$ type dielectric. According to the present invention, particles of a $BaO$—$TiO_2$—$Nd_2O_3$ type dielectric, on the surfaces of which $ZnTiO_3$ and/or $Zn_2TiO_4$ are formed, are obtained by mixing barium oxide BaO, titanium oxide $TiO_2$ and neodymium oxide $Nd_2O_3$ with each other at a predetermined ratio, sintering the mixture, subsequently further mixing zinc oxide (ZnO) with the above mixture and sintering (calcining) the mixture. Materials that can be used for $BaO$—$TiO_2$—$Nd_2O_3$ and ZnO include BaO, $TiO_2$, $Nd_2O_3$ and ZnO, as well as nitrates, carbonates, hydroxides, chlorides and organic metal compounds of Ba, Ti, Nd and Zn that become oxides when sintered.

A low-temperature-sintered dielectric ceramic according to the present invention is characterized by having glass arranged among dielectric particles with $ZnTiO_3$ and/or $Zn_2TiO_4$ formed on the surfaces of particles of the dielectric base material that contains the Ti element. Such a low-temperature-sintered dielectric ceramic is obtained by sintering a low temperature sinterable dielectric ceramic composition prepared by mixing an aggregate of dielectric particles with $ZnTiO_3$ and/or $Zn_2TiO_4$ formed on the surfaces of particles of the dielectric base material that contains the Ti element and a glass component. A dielectric ceramic according to the present invention is obtained at low temperature and, at the same time, shows excellent dielectric characteristics. The glass component is preferably a $ZnO$—$B_2O_3$—$SiO_2$—$Al_2O_3$ type glass material because it is possible to obtain a dielectric ceramic that shows excellent dielectric characteristics by sintering a dielectric ceramic composition containing such a glass material at low temperature, although the present invention by no means limited to the use of such a glass material.

Thus, a dielectric ceramic according to the present invention can be obtained by means of the above-described manufacturing method. In a preferable embodiment of the present invention, one or more oxides of Ti and Zn are formed on the surfaces of calcined particles of a dielectric base material whose average particle diameter has been adjusted to about 0.4 to 3.0 μm to obtain dielectric particles and 2.5 to 20 parts by weight of a vitrified material of a composition containing ZnO by 45 to 70 weight %, $B_2O_3$ by 5 to 13 weight %, $SiO_2$ by 7 to 40 weight % and $Al_2O_3$ by 8 to 20 weight % are added to 100 parts by weight of the high dielectric constant particles, on the surfaces of which one or more oxides of Ti and Zn are formed, to obtain a low temperature sinterable dielectric ceramic composition. Then, a dielectric ceramic can be obtained by sintering the low temperature sinterable dielectric ceramic composition at a temperature level between 880 and 1,000° C. It is possible to raise the relative density of the dielectric ceramic to a level not lower than 90%. The composition of the obtained dielectric ceramic is substantially the same as that of the dielectric ceramic composition before the sintering process. The dielectric ceramic includes the dielectric particles that contain the Ti element, one or more oxides of Ti and Zn formed on the surfaces of the dielectric particles and a glass phase arranged among the particles.

It is possible to obtain various laminated ceramic parts (laminated electronic parts) by molding a dielectric ceramic composition according to the present invention into raw parts that respectively show appropriate profiles and sizes or by forming sheets by means of a doctor blade method, etc. and laminating the sheets (layers of dielectric ceramic composition) and electrodes (metal-containing layers) into raw parts, and then sintering the raw parts. Laminated ceramic parts that can be produced according to the present invention include laminated ceramic capacitors, laminated LC filters, laminated dielectric resonators and laminated dielectric substrates.

An embodiment of laminated ceramic part according to the present invention comprises a plurality of dielectric layers, an internal electrodes each formed between the adjacent dielectric layers and an external electrodes electrically connected to the internal electrodes. The dielectric layers are formed by using dielectric ceramics that are obtained by sintering a dielectric ceramic composition according to the present invention, and the internal electrode is made of Cu, Ag or an alloy material containing Cu or Ag as principal ingredient. A laminated ceramic part according to the present invention is obtained by simultaneously sintering layers containing a dielectric ceramic composition and layers containing Cu, Ag or an alloy material containing Cu or Ag as principal ingredients.

Figure 3:
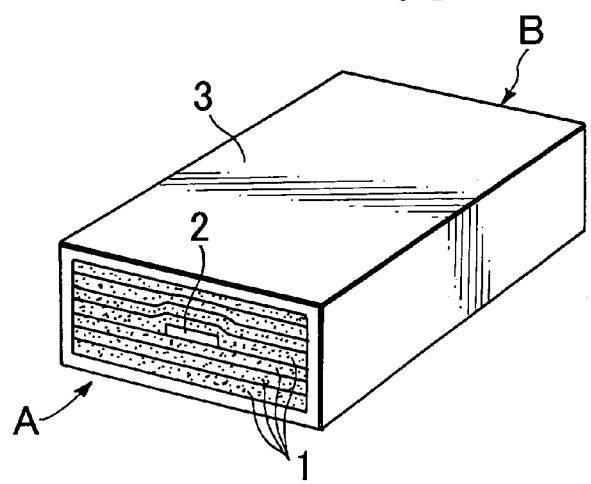
FIG. 3 is a schematic perspective view of a tri-plate type dielectric resonator that can be prepared as an embodiment of laminated electronic part having dielectric ceramics according to the present invention.
Figure 4:
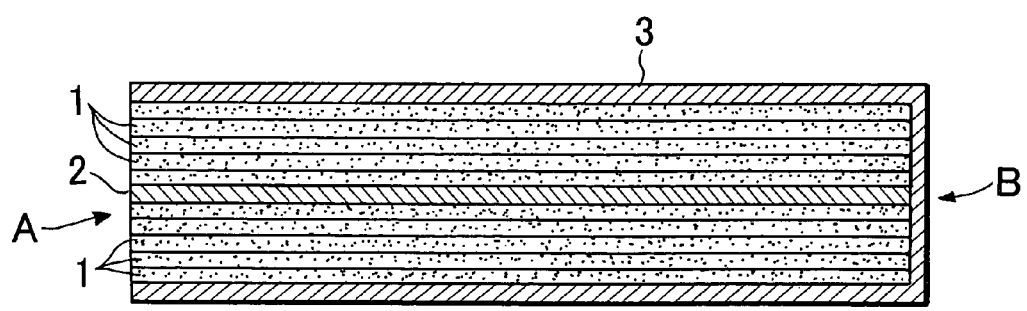
FIG. 4 is a schematic cross-sectional view of the dielectric resonator of FIG. 3.

FIGS. 3 and 4 illustrate a tri-plate type dielectric resonator as an embodiment of laminated ceramic part according to the present invention.

FIG. 3 is a schematic perspective view of the a tri-plate type dielectric resonator that can be prepared by using dielectric ceramics according to the present invention. FIG. 4 is a schematic cross-sectional view of the dielectric resonator of FIG. 3. As shown in FIGS. 3 and 4, the tri-plate type dielectric resonator is a laminated ceramic part that comprises a plurality of dielectric layers 1, an internal electrode 2 formed between the adjacent two dielectric layers and an external electrode 3 electrically connected to the internal electrode. Such a tri-plate type dielectric resonator is obtained by laying a plurality of dielectric layers 1 one on the other with an internal electrode 2 arranged at a central part thereof. The internal electrode 2 is formed so as to extend from the first surface A shown in FIGS. 3 and 4 all the way to the oppositely disposed second surface B. Of the tri-plate type resonator, only the first surface A is open while the external electrode 3 is formed on all the remaining five surfaces of the resonator other than the first surface A and the internal electrode 2 and the external electrode 3 are connected to each other on the second surface B. The internal electrode 2 is made of Cu, Ag or an alloy containing Cu or Ag as principal ingredient. Since a dielectric ceramic composition according to the invention can be sintered at low temperature, it is possible to use such an electrode material.

EXAMPLES

Example 1

A BaO—$TiO_2$—$Nd_2O_3$ type material (particles of a dielectric base material) containing the ingredients to the adjusted compositional ratio as shown in Tables 1A and 1B was prepared and calcined in advance and 1 part by weight of ZnO was added to 100 parts by weight of the dielectric material. They were then put into a ball mill with ethanol and subjected to a wet mixing operation for 12 hours. Note that, in Tables 1A and 1B, the amount of $Bi_2O_3$ and that of $Al_2O_3$, which are auxiliary ingredients of the BaO—$TiO_2$—$Nd_2O_3$ type material, are shown by parts by weight relative to 100 parts by weight of the total amount of BaO, $TiO_2$ and $Nd_2O_3$ that are principal ingredients of the BaO—$TiO_2$—$Nd_2O_3$ type material.

After removing the solvent from the solution, the mixture was calcined at 1,100° C. in the atmosphere to obtain calcined powder (an aggregate of dielectric particles) of the BaO—$TiO_2$—$Nd_2O_3$ type material with one or more oxides of Ti and Zn formed on the surfaces of the particles of the dielectric base material. The average particle size of the calcined powder was 1.0 μm. FIG. 1 is an X-ray diffraction graph of the calcined powder of this example. As seen from FIG. 1, it was found that a $Zn_2TiO_4$ phase and a $ZnTiO_3$ phase were produced as oxides of Ti and Zn in addition to the BaO—$TiO_2$—$Nd_2O_3$ phase in the calcined powder of this example.

Then, 100 parts by weight of the calcined powder of BaO—$TiO_2$—$Nd_2O_3$ type material where a $Zn_2TiO_4$ phase and a $ZnTiO_3$ phase were formed on the surface was put into a ball mill with 5 parts by weight of glass powder (with an average particle size of 1.9 μm) containing ZnO by 45 weight %, $B_2O_3$ by 7 weight %, $SiO_2$ 40 weight % and $Al_2O_3$ by 8 weight % and subjected to a wet mixing operation for 24 hours. Then, the solvent was removed from the solution and the residue was dried to obtain a powdery material (a low temperature sinterable dielectric ceramic composition) to be used for low temperature sintering.

Thereafter, a polyvinyl alcohol solution was added to the powdery material by an appropriate amount and the resultant was dried and thereafter molded into pellet with a diameter of 12 mm and a thickness of 4 mm, which was then sintered at 950° C. for 2 hours in the atmosphere. FIG. 2 is an X-ray diffraction graph of the sintered product. It will be seen from FIG. 2 that a $Zn_2TiO_4$ phase and a $ZnTiO_3$ phase that are oxides of Ti and Zn coexist with the BaO—$TiO_2$—$Nd_2O_3$ phase also in a dielectric ceramic (sintered product) according to the present invention.

The obtained dielectric ceramic was machined to show a diameter of 7 mm and a thickness of 3 mm and subsequently non-loaded Q value, the specific dielectric constant $\epsilon_r$ and the temperature coefficient $\tau_f$ of resonance frequency of the obtained dielectric ceramic in a resonance frequency range of 5 to 7 GHz were determined by a dielectric resonance method. Tables 1A and 1B also summarily shows the obtained results. Each of the examples and the comparative examples was rated by O and x in Table 1, where O indicated that the dielectric characteristics of the obtained dielectric ceramic were good and x indicated either that the dielectric characteristics of the obtained dielectric ceramic were not good or that no dielectric ceramic was obtained.

TABLE 1A

| | Ba—Ti—Nd—O-type material (base material) | | | | | $BaTiO_3$ material | $SrTiO_3$ material | ZnO amount | Dielectric particle | Dielectric/ Glass |
| | mol% | | | (wt. parts to principal ingre.) | | | | | | |
| | BaO | $TiO_2$ | $Nd_2O_3$ | $Bi_2O_3$ | $Al_2O_3$ | (wt. parts) | (wt. parts) | (wt. parts) | size (μm) | (wt. parts) |
|---|---|---|---|---|---|---|---|---|---|---|
| Example 1 | 15 | 69 | 16 | 8 | 0.3 | — | — | 1 | 1.0 | 100/5 |
| Example 2 | 10 | 72 | 18 | 7 | 1 | — | — | 1 | 1.0 | 100/5 |
| Example 3 | 14 | 70 | 16 | 9 | 0.3 | — | — | 0.5 | 1.0 | 100/5 |
| Example 4 | 14 | 70 | 16 | 9 | 0.3 | — | — | 5 | 1.0 | 100/5 |
| Example 5 | 14 | 70 | 16 | 9 | 0.3 | — | — | 10 | 1.0 | 100/5 |
| Example 6 | 10 | 72 | 18 | 7 | 1 | — | — | 1 | 0.5 | 100/11 |
| Example 7 | 10 | 72 | 18 | 7 | 1 | — | — | 1 | 1.0 | 100/11 |
| Example 8 | 10 | 72 | 18 | 7 | 1 | — | — | 1 | 2.0 | 100/11 |
| Example 9 | 14 | 70 | 16 | 9 | 0.3 | — | — | 2.5 | 1.0 | 100/3 |
| Example 10 | 14 | 70 | 16 | 9 | 0.3 | — | — | 2.5 | 1.0 | 100/11 |
| Example 11 | 14 | 70 | 16 | 9 | 0.3 | — | — | 2.5 | 1.0 | 100/20 |
| Example 12 | — | — | — | — | — | 100 | — | 0.5 | 1.0 | 100/8 |
| Example 13 | — | — | — | — | — | — | 100 | 0.5 | 1.0 | 100/8 |
| Comp. ex. 1 | 15 | 69 | 16 | 8 | 0.3 | — | — | 0 | 1.0 | 100/11 |
| Comp. ex. 2 | 10 | 72 | 18 | 7 | 1 | — | — | 0 | 1.0 | 100/11 |
| Comp. ex. 3 | 10 | 72 | 18 | 7 | 1 | — | — | 0 | 0.5 | 100/11 |
| Comp. ex. 4 | 10 | 72 | 18 | 7 | 1 | — | — | 0 | 1.0 | 100/11 |
| Comp. ex. 5 | 10 | 72 | 18 | 7 | 1 | — | — | 0 | 2.0 | 100/11 |
| Comp. ex. 6 | — | — | — | — | — | 100 | — | 0 | 1.0 | 100/11 |
| Comp. ex. 7 | — | — | — | — | — | — | 100 | 0 | 1.0 | 100/11 |

TABLE 1B

| | Glass material (wt. %) | | | | Sintering temp. (° C.) | Dielectric characteristics | | | | | Good/bad determined |
|---|---|---|---|---|---|---|---|---|---|---|---|
| | ZnO | B$_2$O$_3$ | SiO$_2$ | Al$_2$O$_3$ | | Specific dielectric constant εr | Relative density (%) | Q * f (GHz) | tanδ (10 MHz) | τf (ppm/° C.) | |
| Example 1 | 45 | 7 | 40 | 8 | 950 | 65 | 93 | 4000 | — | 8 | ○ |
| Example 2 | 45 | 7 | 40 | 8 | 950 | 67 | 95 | 2900 | — | 15 | ○ |
| Example 3 | 70 | 7 | 11 | 12 | 950 | 62 | 97 | 3000 | — | 12 | ○ |
| Example 4 | 70 | 7 | 11 | 12 | 950 | 60 | 97 | 4000 | — | 1 | ○ |
| Example 5 | 70 | 7 | 11 | 12 | 950 | 52 | 97 | 1500 | — | −9 | ○ |
| Example 6 | 45 | 7 | 40 | 8 | 900 | 67 | 97 | 3000 | — | 17 | ○ |
| Example 7 | 45 | 7 | 40 | 8 | 920 | 67 | 95 | 2900 | — | 15 | ○ |
| Example 8 | 45 | 7 | 40 | 8 | 1000 | 65 | 92 | 2850 | — | 13 | ○ |
| Example 9 | 70 | 7 | 11 | 12 | 1000 | 65 | 95 | 5500 | — | 20 | ○ |
| Example 10 | 70 | 7 | 11 | 12 | 920 | 63 | 97 | 3500 | — | 5 | ○ |
| Example 11 | 70 | 7 | 11 | 12 | 890 | 53 | 97 | 3000 | — | −15 | ○ |
| Example 12 | 45 | 7 | 40 | 8 | 950 | 1300 | 95 | — | 0.03 | — | ○ |
| Example 13 | 45 | 7 | 40 | 8 | 950 | 227 | 93 | 1800 | — | 1900 | ○ |
| Comp. ex. 1 | 45 | 7 | 40 | 8 | 1000 | | | Not sintered | | | X |
| Comp. ex. 2 | 45 | 7 | 40 | 8 | 1000 | | | Not sintered | | | X |
| Comp. ex. 3 | 45 | 7 | 40 | 8 | 1000 | | | Not sintered | | | X |
| Comp. ex. 4 | 45 | 7 | 40 | 8 | 1000 | | | Not sintered | | | X |
| Comp. ex. 5 | 45 | 7 | 40 | 8 | 1000 | | | Not sintered | | | X |
| Comp. ex. 6 | 45 | 7 | 40 | 8 | 1000 | | | Not sintered | | | X |
| Comp. ex. 7 | 45 | 7 | 40 | 8 | 1000 | | | Not sintered | | | X |

Examples 2 through 11

In each of the examples, an aggregate of dielectric particles with one or more oxides of Ti and Zn formed on the surfaces thereof under the conditions shown in Tables 1A and 1B and glass powder having a composition also shown in Tables 1A and 1B were mixed at the compounding ratio also shown in Tables 1A and 1B as in Example 1, and pellets of the sintered product were prepared under the same conditions as those of Example 1. Then, the characteristics of the pellets were evaluated as in Example 1. Tables 1A and 1B also summarily shows the obtained results.

Examples 12 and 13

In each of the examples, an aggregate of dielectric particles of BaTiO$_3$ or SrTiO$_3$ with one or more oxides of Ti and Zn formed on the surfaces thereof under the conditions shown in Tables 1A and 1B and glass powder having a composition also shown in Tables 1A and 1B were mixed at the compounding ratio also shown in Tables 1A and 1B as in Example 1, and pellets of the sintered product were prepared under the same conditions as those of Example 1. Then, the characteristics of the pellets were evaluated as in Example 1. Tables 1A and 1B also summarily shows the obtained results.

Comparative Examples 1 through 5

In each of the comparative examples, an aggregate of dielectric particles of a BaO—TiO$_2$—Nd$_2$O$_3$ type material having a composition as shown in Tables 1A and 1B without forming any oxide of Ti and Zn on the surfaces thereof and glass powder having a composition also shown in Tables 1A and 1B were mixed at the compounding ratio also shown in Tables 1A and 1B as in Example 1, and pellets of the sintered product were prepared under the same conditions as those of Example 1. Then, the characteristics of the pellets were evaluated as in Example 1. Tables 1A and 1B also summarily shows the obtained results.

Comparative Examples 6 and 7

In each of the comparative examples, an aggregate of dielectric particles of BaTiO$_3$ or SrTiO$_3$ without forming any oxide of Ti and Zn on the surfaces thereof and glass powder having a composition shown in Tables 1A and 1B were mixed at the compounding ratio also shown in Tables 1A and 1B as in Example 1, and pellets of the sintered product were prepared under the same conditions as those of Example 1. Then, the characteristics of the pellets were evaluated as in Example 1. Tables 1A and 1B also summarily shows the obtained results.

Example 14

Figure 5:
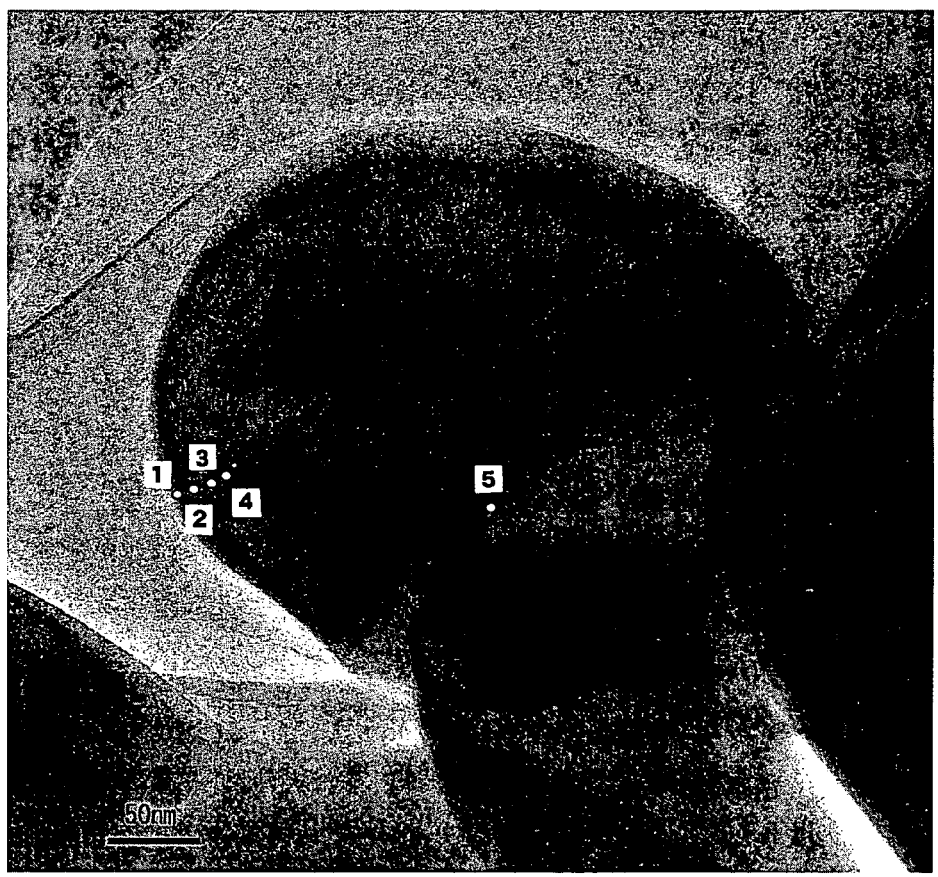
FIG. 5 is a photograph of dielectric particles of the dielectric particle aggregate according to the present invention obtained in Example 3, as observed through a transmission type electron microscope.
Figure 6:
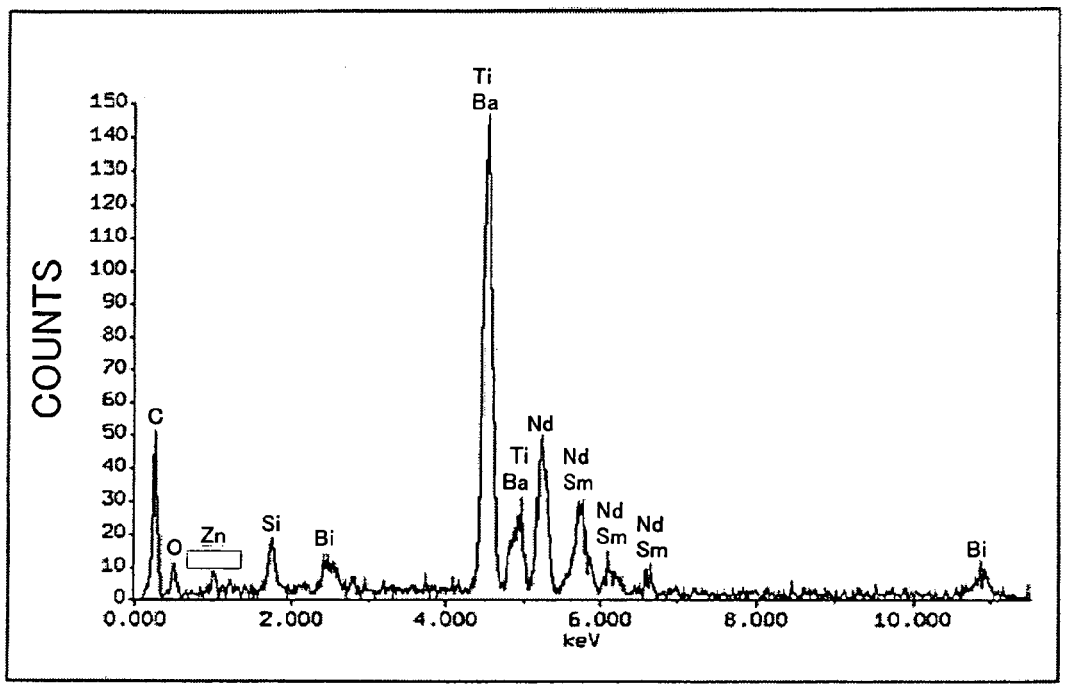
FIG. 6 is a spectrograph obtained at spot 1 in FIG. 5 by means of an EDS (energy dispersive spectrometer)
Figure 7:
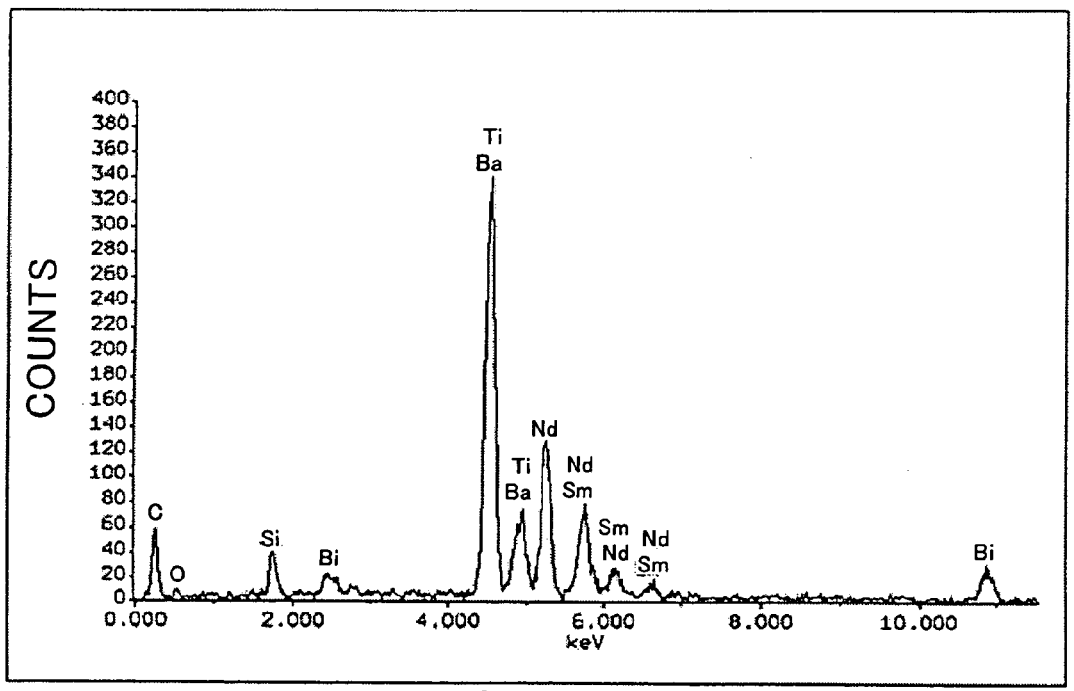
FIG. 7 is a spectrograph obtained at spot 5 in FIG. 5 by means of the EDS, wherein reference numeral 1 denotes a dielectric ceramic layer, reference numeral 2 denotes an internal conductor, and reference numeral 3 denotes an external conductor.

Dielectric particle prepared under the same conditions as those of Example 3 with one or more oxides of Ti and Zn formed on the surfaces thereof was processed by Ar ion milling to prepare a specimen of this example and the inside of the dielectric particle was observed through JEM-2010F available from JEOL, Ltd. (field emission type transmission electron microscope, acceleration voltage: 200 kV). The composition was evaluated by a UTW type Si (Li) semiconductor detector (beam diameter: 1 nm) available from NORAN. The results are shown in FIGS. 5, 6 and 7 and Table 2. FIG. 5 is a photograph of dielectric particle with one or more oxides of Zn and Ti formed on the surfaces of particles of the dielectric base material containing the Ti element obtained in Example 3, as observed through a transmission electron microscope. FIGS. 6 and 7 are EDS spectrograph obtained respectively at spot 1 and at spot 5 in FIG. 5.

From Table 2 shown below, it will be seen that Zn was detected only at spots 1 through 3 but not detected at spots 4 and 5. Particularly, Zn was observed particularly at spots 1 and 2 and highly intensively at spot 1. Thus, it will be safe to assume that one or more oxides of Ti and Zn were formed only in the surface layer of dielectric particles and that the thickness of the surface layer is not greater than 50 nm by referring to FIG. 4.

TABLE 2

| Observation spot | Counts | | wt % | | Atom % | |
|---|---|---|---|---|---|---|
| | Ba | Zn | Ba | Zn | Ba | Zn |
| 1 | 440 | 761 | 14.0 | 17.4 | 7.3 | 19.0 |
| 2 | 918 | 62 | 18.5 | 0.9 | 12.4 | 1.3 |
| 3 | 1014 | 17 | 18.3 | 0.2 | 12.5 | 0.3 |
| 4 | 1121 | 0 | 17.1 | 0.0 | 11.6 | 0 |
| 5 | 1551 | 0 | 19.2 | 0.0 | 13.3 | 0 |

What is claimed is:

1. A dielectric particle aggregate made of dielectric particles of $BaO$—$TiO_2$—$Nd_2O_3$ type dielectric or $SrTiO_3$ type dielectric, wherein each of the particles contain $ZnTiO_3$ and/or $Zn_2TiO_4$ in the surface layer thereof.

2. The dielectric particle aggregate as claimed in claim 1, wherein the $BaO$—$TiO_2$—$Nd_2O_3$ type dielectric contains as principal ingredients BaO by 10 to 16 mol %, $TiO_2$ by 67 to 72 mol % and $Nd_2O_3$ by 16 to 18 mol % and as auxiliary ingredients Bi2O3 by 7 to 10 parts by weight and $Al_2O_3$ by 0.3 to 1.0 parts by weight relative to 100 parts by weight of the principal ingredients.

3. The dielectric particle aggregate as claimed in claim 1, wherein the surface layer has a thickness not greater than 50 nm.

4. The dielectric particle aggregate as claimed in claim 3, wherein the surface layer has a thickness not less than 10 nm.

5. The dielectric particle aggregate as claimed in claim 1, wherein the dielectric particle aggregate has an average particle size of 0.4 μm to 3.0 μm.

6. The dielectric particle aggregate as claimed in claim 1, wherein $ZnTiO_3$ and/or $Zn_2TiO_4$ is contained only in the surface layer of the particles.

7. A method of manufacturing a dielectric particle aggregate as claimed in claim 1, comprising the steps of mixing ZnO with an aggregate of particles of a dielectric base material containing Ti and subjecting the resultant mixture to a calcining process.

8. The method of manufacturing dielectric particle aggregate as claimed in claim 7, wherein 0.5 to 10 parts by weight of ZnO is mixed with 100 parts by weight of the aggregate of particles of dielectric base material.

9. The method of manufacturing dielectric particle aggregate as atmosphere.

10. The method of manufacturing dielectric particle aggregate as claimed in claim 7, wherein the temperature of the calcining process is 900 to 1,2000° C.

11. The method of manufacturing dielectric particle aggregate dielectric ceramic as claimed in claim 7, wherein the particles of dielectric base material practically do not contain Zn.

12. The method of manufacturing dielectric particle aggregate dielectric ceramic as claimed in claim 7, wherein $ZnTiO_3$ and/or $Zn_2TiO_4$ is formed on the surface of the particles of dielectric base material in the calcining process.

13. A low temperature sinterable dielectric ceramic composition containing the dielectric particle aggregate as claimed in claim 1 by 100 parts by weight and a glass component by 2.5 to 20 parts by weight.

14. The low temperature sinterable dielectric ceramic composition as claimed in claim 13, wherein the glass component contains ZnO by 45 to 70 wt %, $B_2O_3$ by 5 to 13 wt %, $SiO_2$ by 7 to 40 wt % and $Al_2O_3$ by 8 to 20 wt %.

* * * * *

UNITED STATES PATENT AND TRADEMARK OFFICE
CERTIFICATE OF CORRECTION

| | | |
|---|---|---|
| PATENT NO. | : 7,641,970 B2 | Page 1 of 1 |
| APPLICATION NO. | : 10/590779 | |
| DATED | : January 5, 2010 | |
| INVENTOR(S) | : Kawano et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 326 days.

Signed and Sealed this

Twenty-first Day of December, 2010

David J. Kappos
*Director of the United States Patent and Trademark Office*